June 20, 1967  J. M. TOPAZ  3,326,103
AUXILIARY SHUTTER TIMING MECHANISM
Filed Dec. 9, 1964  2 Sheets-Sheet 1

INVENTOR.
Jeremy M. Topaz
BY Brown and Mikulka
and
Donald M. Sandler
ATTORNEYS

June 20, 1967  J. M. TOPAZ  3,326,103
AUXILIARY SHUTTER TIMING MECHANISM
Filed Dec. 9, 1964  2 Sheets-Sheet 2

INVENTOR.
Jeremy M. Topaz
BY Brown and Mikulka
and
Donald M. Sandler
ATTORNEYS

United States Patent Office 3,326,103
Patented June 20, 1967

3,326,103
AUXILIARY SHUTTER TIMING MECHANISM
Jeremy M. Topaz, Brighton, Mass., assignor to Polaroid Corporation, Cambridge, Mass., a corporation of Delaware
Filed Dec. 9, 1964, Ser. No. 417,064
5 Claims. (Cl. 95—10)

This invention relates to automatic exposure control cameras, and more particularly, to a camera of the type described provided with a shutter mechanism with which the exposure interval is determined by the time required for a capacitor to charge to a predetermined level through a light dependent resistor (LDR).

The capacitor-LDR configuration referred to is essentially an integrator circuit which responds to the application of a step voltage by producing an output which changes with time in a manner functionally dependent upon the resistance of the LDR. If the conductance of the LDR is proportional to the light intensity, the voltage on the capacitor at any instant subsequent to the application of the step voltage is a measure of the value of the time-integral of the light incident on the LDR to that instant. To a first approximation, then, the voltage on the capacitor will reach its predetermined level when the amount of light incident on the LDR has some predetermined value regardless of the time variation of the light. Where the LDR is essentially linear or the circuit containing the LDR is compensated to make the latter linear over some range of levels of brightness (which is to say that the conductance varies directly with brightness to the first power); and has negligible delay in response, or the circuit containing the LDR is compensated to overcome the LDR's delay (which is to say that the conductance can change in response to changes in brightness substantially as fast as the brightness can change), the shutter mechanism will be effective to achieve correct exposure automatically for a scene illuminated by a flash bulb as well as for a scene illuminated by steady state light.

To understand some of the problems associated with the use of an integrator circuit of the character described, it must be realized that usually, termination of exposure is actually controlled by a change in the conducting state of an electromagnet associated with the shutter mechanism. Such change is usually brought about the action of a voltage-sensitive trigger circuit when it responds to the output of the integrator circuit reaching the predetermined level or trigger voltage. However, when there is a low level of ambient illuminatiton and a flash bulb is used to illuminate the subject being photographed, it is possible that the amount of light from the flash bulb which is reflected from the subject and incident on the LDR is not enough to cause the output of the integrator to reach the trigger voltage. In such case, the voltage-sensitive trigger circuit fails to respond, there is no change in the conducting state of the electromagnet, and exposure continues until the power supply is disconnected. The resulting photograph will be of poor quality when the source of ambient illumination has a different color temperature and color film is being used because shadows in the photograph caused by the flash will be filled in by ambient light and hence be of incorrect color. Additionally, the photograph may include smears caused by relative movement between subject and camera and seen in ambient light.

From the above, it can be seen that the integrator circuit is only conditionally effective to automatically control the termination of exposure. This failure to automatically terminate exposure sometimes is due to attempting to use the camera beyond the range for which it was designed, as for example, in trying to attain flash pictures of a very distant subject against a very dark background. Frequently, however, the light output of the flash bulb drives the voltage on the capacitor almost to the trigger voltage just as the light output reaches zero. Under some conditions of subject and background, for example a small highly reflective subject against a large dark background, an acceptably exposed picture would be attained even if the time integral of light incident on the LDR upon extinction of the flash bulb is less than the predetermined value associated with the trigger voltage. This is the case because the LDR responds to the *average* value of scene brightness.

There is a significant advantage in terminating exposure automatically upon extinction of the flash bulb in the event that exposure is not terminated prior thereto, and this constitutes the primary object of the present invention. To understand such advantage, it must be understood that in the event the value of time integral of light fails to reach the preselected value which causes the voltage on the capacitor to reach the trigger voltage, the camera shutter remains open until the power supply is disconnected. In a camera where power is supplied as long as the shutter actuator button remains manually depressed, this means that the shutter will remain open for 500 ms. or longer, about 10 times the interval during which a flash bulb produces an output. During this 500 ms., it is virtually impossible to hold a camera steady by hand, and if there is any ambient light present, the photograph of the subject will be blurred. Another problem is due to the fact that the color temperature of ambient light usually differs from the color temperature of the flash bulb with the result that when color film is being used, shadows produced by the flash bulb are filled in by the ambient light producing orange-colored shadows.

Briefly, the invention involves modifying the integrator circuit, whenever the camera is to be used for flash operation. Specifically, an auxiliary resistor of fixed value is shunted across the LDR in response to insertion of the flash plug connected to the flash bulb into the jack associated with the flash contacts of the camera. In the preferred form of the invention, the value of the resistor is selected such that the time constant of the fixed resistor and the capacitor of the integrator circuit is about 250 ms. Thus, when time integral of light incident on the LDR rapidly (relative to 250 ms.) reaches the predetermined level, most of the current by which the capacitor is charged flows through the LDR and the fixed resistor exerts a relatively small influence on the exposure duration. However, when the integral of light slowly approaches the predetermined level, the fixed resistor has a greater influence because more current flows therethrough. In the more usual situations of ambient light level, subject reflectivity, etc., it has been found that exposure is terminated 20–30 ms. after the end of the flash output which means that with flash illumination the time required for the integrator to develop the trigger voltage seldom exceeds 60–80 ms.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein.

Figure 3:
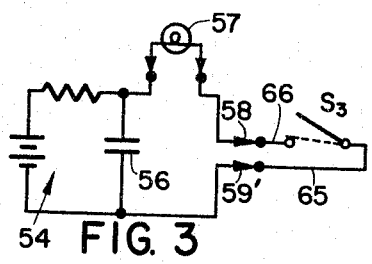
Figure 4:
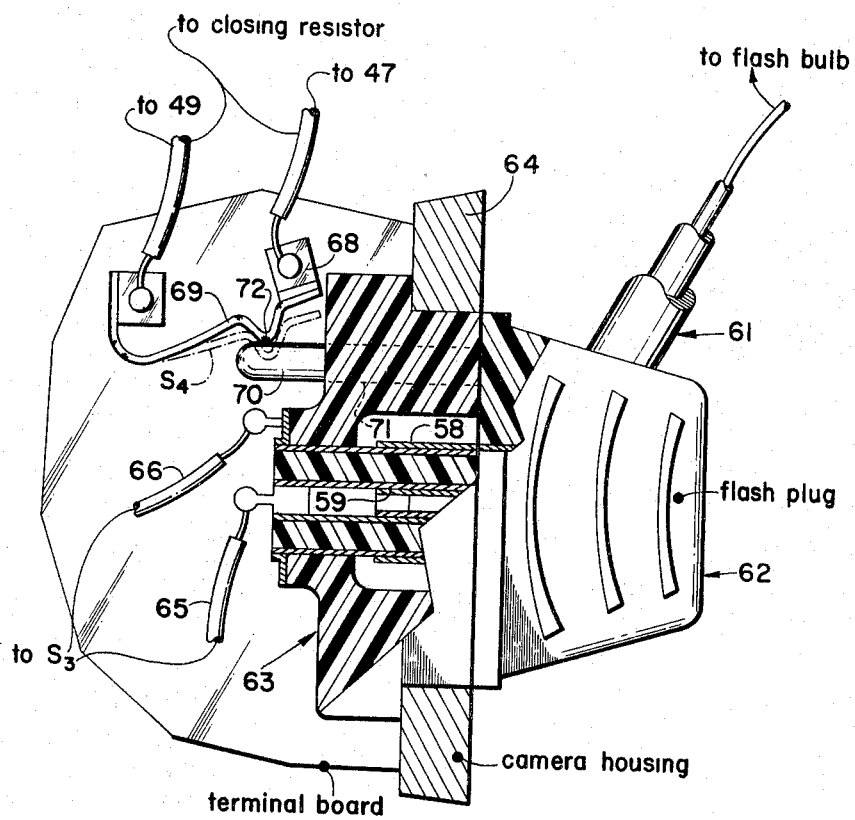

FIG. 3 is a schematic diagram of a flash gun showing its connection to the flash synchronization contacts of the camera; and FIG. 4 is a sectional view of a camera housing showing the plug associated with a flash gun inserted in the jack on the housing connected to the flash contacts and showing how the insertion of the plug into the jack serves to close a switch which shunts the LDR with a fixed resistor.

The shutter control means to be described is shown in the drawings as embodied into a camera having a particular type of shutter, but the latter is for the purpose of illustrating the invention in a simple environment, it being understood that other types of shutters could also be used with the shutter control means disclosed and claimed herein in order to derive the new and improved results attendant thereto.

Figure 1:
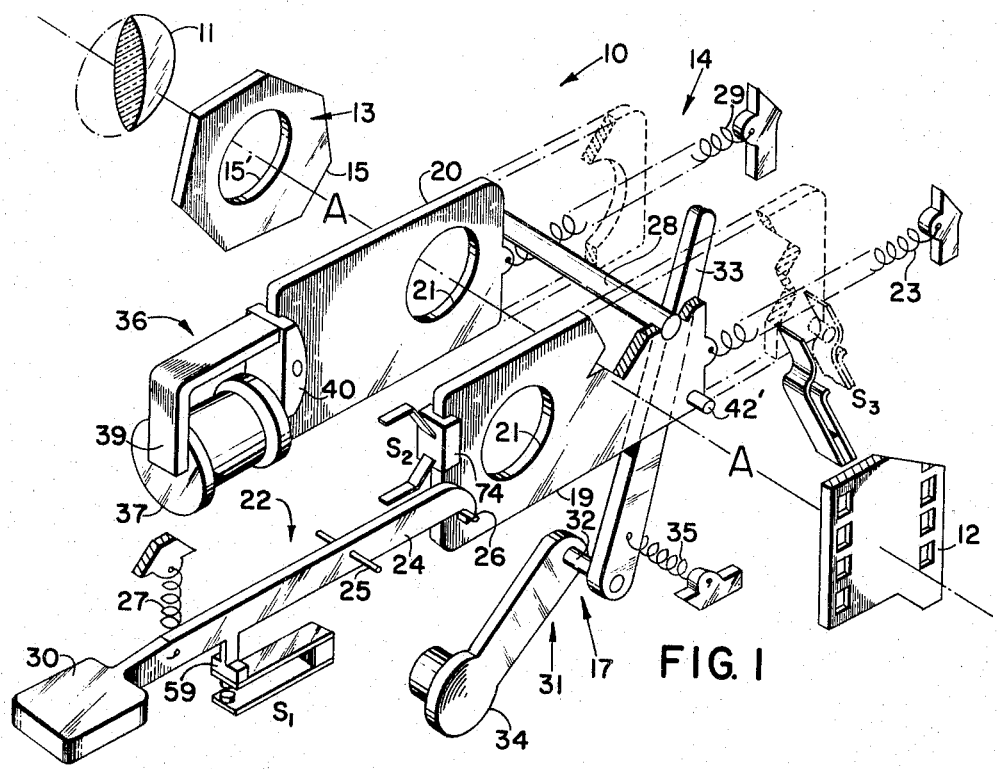
FIGURE 1 is a schematic representation of a camera having shutter means particularly well adapted for use with the present invention.

Referring now to FIGURE 1, camera 10 is shown schematically as including lens 11 for receiving light from a scene being photographed, and focusing it through an aperture in diaphragm means 13 onto film 12 to effect exposure of the latter by the proper operation of shutter mechanism 14 which is interposed in the optical path of the light.

Diaphragm 13 may take the form of a disc 15 mounted on the camera housing. Disc 15 contains exposure aperture 15' of preselected area perpendicular to the optical axis A—A of the camera.

Figure 2:
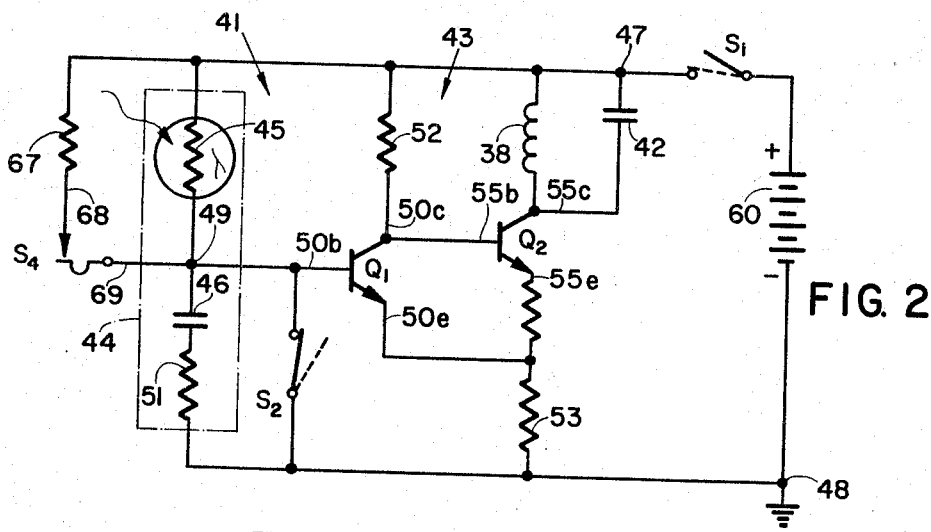
FIG. 2 is a schematic electrical diagram showing one embodiment of the present invention.

Shutter mechanism 14 may include shutter means 17 shown in FIGURE 1, and shutter control means 18 shown in FIG. 2. Shutter means 17 may take the form of a pair of planar, opaque blades 19 and 20, each provided with an exposure orifice 21, and mounted in tracks (not shown) so as to be normal to the optical axis, and reciprocable between terminal positions into intersection with the optical axis. Each of the blades has one terminal position at which the solid portion overlies and totally blocks the exposure aperture in diaphragm means 13 (closed position), and another terminal position at which the exposure orifice is aligned with the exposure aperture (open position). Between these two terminal positions, each blade has an intermediate position at which it covers only a portion of the exposure aperture. In accordance with convention, it is assumed that the intermediate position at which half of the exposure aperture area is covered is the position at which exposure is either initiated or terminated as the case may be. The blade that causes exposure to be initiated is called the "opening" blade. The terminal position at which the opening blade is in the closed position is termed the "blocking" position, while the position intermediate the two terminal positions of the opening blade at which it initiates exposure is termed the "unblocking position." Conversely, the blade that causes exposure to be terminated is called the "closing" blade. The terminal position at which the closing blade is in the open position is termed the "unblocking" position, while the position intermediate the two terminal positions of the closing blade at which it terminates exposure is termed the "blocking" position.

Prior to initiation of exposure, the blades are as shown in the solid lines of FIGURE 1, inspection of which will indicate that releasable coupling means 22 is engaged with opening blade 19 to hold the latter in blocking position against the bias of spring means 23 which urges the blade toward unblocking position. Coupling means 22 includes latch 24 pivotally mounted on pin 25 and engaged with latch pin 26 attached to blade 19. Latch spring 27 engaged with latch 24 urges the latter into latching contact with pin 26. Reset bar 28 is rigidly attached to the end of blade 19 remote from the end containing exposure orifice 21, and extends normal thereto into the path of movement of closing blade 20. When the opening blade is held in blocking position by coupling means 22, bar 28 is effective to engage blade 20 and to maintain the latter in the open position against the bias of spring means 29 urging the closing blade toward its blocking position. As can be seen from the drawings, bar 28 does not interfere with the independent movement of opening blade 19 to its open position.

Such movement takes place upon manual depression of end portion 30 of latch 24, which rotates the latter about pivot 25 out of engagement with pin 26. Upon disengagement of coupling means 22 from opening blade 19, the latter moves out of blocking position toward open position, and bar 28 is no longer effective to maintain closing blade 20 in its open position. However, initial movement of opening blade 19, in response to the disengagement of coupling means 22 therefrom, is effective to cause shutter control means 18, in a manner to be described later, to retain closing blade 20 in its open position for a preselected period of time depending on the level of scene brightness. Since the opening blade moves to unblocking position while the shutter control means releasably retains the closing blade in open position, exposure is initiated. In other words, the shutter operator means is so operably associated with the shutter means, that the latter is caused to initiate exposure in response to actuation of the shutter operator means. At the end of said preselected period of time, shutter control means 18 causes closing blade 20 to be released thus terminating exposure as the latter is moved from open to blocking position by the action of bias spring means 29.

After exposure is terminated, blades 19 and 20 are in the position shown by the broken lines of FIGURE 1. That is to say, blade 19 is in open position and blade 20 is in its closed position, with reset bar 28 again engaged with blade 20. Having completed the exposure cycle, the blades are returned to their normal positions by reset mechanism 31 which includes reset shaft 32 rotatably mounted on the camera housing, reset lever 33 rigidly fixed to one end of shaft 32 and manual reset actuator 34 rigidly fixed to the other end of the shaft. Spring means 35 biases lever 33 to its normal position out of the path of movement of reset bar 28. However, the manual rotation of lever 33 against spring 35, achieved by the manual rotation of actuator 34 after exposure is terminated, causes lever 33 to engage bar 28 and move both blade 19 and blade 20 back to their normal, pre-exposure positions wherein the opening blade is in blocking position and the closing blade is in open position, the blades being held there by the action of coupling means 22. Upon release of actuator 34, lever 33 returns to its normal position, and the mechanism is ready for the next exposure cycle. If desired, the manual rotation of actuator 34 can be coupled to a film indexing mechanism.

Shutter control means 18 includes shutter operator means 36 actuatable to cause shutter means 17 to initiate exposure, and deactuatable after said preselected period of time to cause the shutter means to terminate exposure, as previously described. Specifically, operator means 36 may take the form of an electromagnet 37 which has solenoid 38 (see FIG. 2) wound around one leg of U-shaped pole-piece 39, the free ends of which are coplanar and cooperable with magnetizable keeper 40 mounted on closing blade 20 when the latter is in open position. Pole-piece 39 and keeper 40, in such position, define a magnetic circuit of a particular reluctance such that a preselected magnetomotive force (solenoid current) applied to the magnetic circuit is sufficient to establish an attractive force between the pole-piece 39 and the keeper 40 that exceeds the separating force exerted on the closing blade by the biasing action of spring means 29 and is sufficient to resist dynamic loads, such as those due to the shock of the bottoming of the opening blade.

As shown in FIG. 2, shutter control means 18 further includes shutter timing apparatus 41, the purpose of which is to furnish an energizing current to the solenoid of electromagnet 37. Where the camera is to be portable and hence battery operated, it is essential to minimize current drain on the battery. With this in mind, premature release of closing blade 20 is prevented and accurate control of the time that the closing blade is held in unblocking position is obtained by rapidly energizing the solenoid just prior to the release of the opening blade, and effecting a rapid release of the closing blade by the electromagnet at the proper time.

The solenoid must be energized before opening blade 19 begins to move out of nublocking position, because this blade, through bar 28, serves to initially position keeper 40 in engagement with pole-piece 39. Once the keeper has separated even slightly from the pole-piece, the reluctance of the magnetic circuit is so high, that the solenoid current is unable to produce an attractive force that will overcome the force of spring 29 urging the closing blade to blocking position.

For the reasons set forth above, namely rapid switching of the current input to the solenoid and low power consumption, shutter timing apparatus 41 may take the form of a transistorized Schmitt-type trigger circuit 43 responsive to the output voltage from timing circuit 44. The latter includes light dependent resistor 45, such as a cadmium sulfide photocell or the like exposed to light from the scene being photographed and having a resistance functionally related to the level of scene brightness, and capacitor 46 connected in series between terminals 47 and 48 of the shutter timing apparatus. Circuit 44 constitutes a conventional integrator circuit whose input terminal is at 47 and whose output terminal is at 49, the connection between capacitor 46 and element 45.

Circuit 43 has an input that is a normally non-conducting stage, and includes transistor $Q_1$; and an output that is a normally conducting stage, and includes transistor $Q_2$. $Q_1$ has base, collector and emitter electrodes $50b$, $50c$ and $50e$ respectively with electrode $50c$ connected through load resistor 52 to terminal 47, electrode $50e$ connected to terminal 48 through common emitter resistor 53 and electrode $50b$ connected to connection 49 such that element 45 defines for $Q_1$ a base bias resistor. The base of $Q_1$ is initially grounded through switch S2 (closed prior to initiation of exposure) and the emitter is coupled to terminal 47 through bias resistor 53. $Q_2$ has base, collector and emitter electrodes $55b$, $55c$ and $55e$ respectively. The base of $Q_2$ is directly coupled to the collector of $Q_1$ and the emitter is coupled to terminal 48 through common emitter resistor 53. The collector of $Q_2$ is coupled to terminal 47 through solenoid 38 which constitutes the load for this transistor. While the stages of circuit 43 have been characterized as "normally not-conducting" and "normally-conducting," it should be obvious that this characterization is applicable only when a voltage source is applied across terminals 47 and 48.

In order to take a picture, an operator depresses end portion 30 of lever 24 (see FIGURE 1). Switch operating arm 59 engages the contacts of switch S1 before the rotation imparted to lever 24 effects its disengagement from pin 26, closing the contacts and applying battery 60, of voltage $E_0$, across terminals 47 and 48. In this way, current drain on the battery is minimized. The battery will be applied across the terminals as long as the operator maintains lever 24 in its depressed state, and since the human reaction time in depressing and releasing portion 30, and the inertial delay of the lever in returning to its normal position substantially exceeds the longest exposure likely to be used under normal "snap-shot" conditions, the contacts of S1 will be closed for at least as long as the current exposure time.

When S1 is initially closed, S2 is closed and the flow of current through resistor 53 due to conduction of $Q_2$ establishes a reverse bias condition on the base-emitter function of $Q_1$ and the latter is cut off. Thus, when S1 is closed, solenoid 38 is instantaneously energized to provide in the magnetic circuit of pole-piece 39 and keeper 40 a magnetic induction sufficiently large to create a force on the keeper that is greater than the bias due spring 29, and the closing blade is thus held in its terminal blocking position independently of the opening blade.

When lever 24 is disengaged from pin 26, the bias on the opening blade is effective to cause the latter to move toward its unblocking terminal position. Initial movement of the opening blade opens S2 which serves to activate timing network 44, which is to say that the latter generates at connection 49 a time variable voltage. The voltage at connection 49 at which $Q_1$ is forward biased is termed the trigger voltage and the time to reach this voltage after activation of the timing network is termed the trigger generation time.

When the trigger voltage is reached, $Q_1$ conducts heavily drawing collector current and rapidly and simultaneously lowering the voltage at electrodes $50c$ and $55b$. This change is reflected by reducing the forward bias on $Q_2$ and reducing current in resistor 53. This causes $Q_1$ to conduct to a greater extent with the result that the regenerative feedback between the stages causes conduction to switch rapidly. Thus, $Q_2$ abruptly ceases conducting and the solenoid is deenergized. Capacitor 42 coupled across the solenoid prevents the voltage induced therein due to the changing current in the solenoid and changing flux in the magnetic field from damaging $Q_2$. The closing blade is thus released for movement to its terminal blocking position.

Referring back now to the disengagement of lever 24 from pin 26, opening blade 19 requires a finite time, termed the opening blade delay, to move from its terminal blocking position to its intermediate position at which exposure is initiated. When the solenoid is deenergized, colsing blade 20 requires a finite time, termed the closing blade delay, to move from its terminal unblocking position to its intermediate position at which exposure is terminated. By making two blade delays the same, the trigger generation time is essentially equal to the exposure time even though the two times are not concurrent. And, since the time between the closing of S1 and the initial movement of the opening blade is so small in comparison to the exposure time, it may be said that the exposure time is essentially the time that the shutter operator means is actuated (solenoid is energized). Because the resistance of element 45 is functionally related to the level of scene brightness, the exposure time is also functionally related to the level of scene brightness. With proper design, the amount of light received by the film (time integral of brightness evaluated between the initiation and termination of exposure) will be substantially constant over a wide range of levels of scene brightness. In other words, the amount of light received by the film is substantially independent of the level of scene brightness and the manner in which it changes with time.

When the steady state or ambient illumination drops below the design level at which the exposure duration becomes greater than about 125 ms., it becomes impractical to hold the camera by hand sufficiently steady to achieve consistently good results. In such case, flash illumination must be used and to this end, flash contact switch S3 is provided. Flash illumination is also required where the film being used is color-balanced for daylight, for example, and the ambient illumination has a different color temperature. In either event, switch S3 is normally open as shown in FIGURE 1, but pin 42 affixed to opening blade 19 engages one arm of the switch when the blade moves toward its opening position flexing the one arm into engagement with the other arm of the switch. In point of time, the closing of S3 occurs about the same time the opening blade reaches unblocking position in order to prevent the engagement of the opening blade with the switch arm from adversely increasing the opening blade delay. This means that the light output from the flash bulb begins to increase about the same time the opening blade reaches unblocking position thereby activating the timing circuit by causing a current to begin to flow through LDR 45 and charge capacitor 46. Recalling that there is finite blade delay, it can be appreciated that very little light from the flash bulb will be reflected from the subject into exposure aperture 15′ in the time interval between the closing of S3 and the movement of the opening blade to unblocking position. Most flash bulbs peak about 20 ms. after ignition which means that if an exposure of about 1/50 second is desired, the exposure must terminate about the time that the light output of the bulb peaks. Recalling that the opening blade delay is substantially equal to the closing blade delay, it is apparent that considerably more light will be reflected from the subject into exposure aperture 15′ during the closing blade delay than during the opening blade delay. Even if the LDR can accurately track the changes in brightness produced by the changing output of the flash bulb, the time integral of light falling on the film under flash illumination conditions will not be the same as when the light is steady state since the amount of light received by the film during the closing blade delay greatly exceeds the light received during opening blade delay. Obviously, more light than is required for proper exposure will fall on the film, with the result that means must be provided for reducing the trigger generation time under flash illumination conditions. To this end, compensating resistor 51 in series with capacitor 46 is provided. The presence of this resistor serves to establish at terminal 49, a voltage different from the voltage at terminal 48 at the instant after switch S2 is opened. Thus, the voltage differential across LDR 45 upon initiation of timing is less than when resistor 51 is not present, and the voltage at terminal 49 is closer to the trigger voltage. In this manner, the triggering of voltage-sensitive circuit 43 is advanced sufficiently to reduce the total light received by the film to a value closer to the correct value, the degree of correction being dependent upon the value of the resistor and the ambient light level.

In order to permit flash pictures to be taken with the camera, it is conventional to provide a flash attachment indicated in schematic form in FIG. 3 by reference numeral 54. As shown, a battery maintains a charge across capacitor 56 which is shunted across flash bulb 57 through open terminals 58, 59′. When the latter are shorted, capacitor 56 discharges through bulb 57 producing the desired burst of light. Flash attachment 54 is therefore attachable to the camera housing (not shown) and terminals 58, 59′ are usually characterized by twin-lead cable 61 terminating in flash plug 62 as shown best in FIG. 4. The flash plug mates with flash jack 63 mounted in wall 64 of the camera housing so that electrical contact is made with switch S3 through leads 65 and 66. The closing of S3 by pin 42′ shorts capacitor 56 and the latter discharges into lamp 57.

As indicated previously, the problem of limiting the exposure under flash conditions to a predetermined maximum period of time is solved by shunting LDR 45 with a resistor which provides a significant path for charging current only when the light reflected from the subject and incident on the LDR is not sufficient to cause the timing circuit (consisting of LDR 45, capacitor 46 and compensating resistor 51) to generate the trigger voltage in about 60–80 ms. In order to provide a resistor in shunt with the LDR only under flash operation, one end of closing resistor 67 is connected directly to the common terminal 47. The other end of resistor 67 is connected to one arm 68 of switch S4 which is a normally open switch. The other arm 69 of switch S4 is directly connected to terminal 49 and is movable into electrical contact with arm 68 in response to insertion of plug 62 into socket 63.

To accomplish this, plug 62 is provided with a nonconducting axially projecting extension 70 which fits into matching axial aperture 71 in the socket. Upon full insertion of the plug into the socket, the free end of extension 70 abuts projection 72 on arm 69 deflecting the latter into electrical contact with arm 68 of switch S4. Thus, closing resistor 67 constitutes means made effective upon insertion of the plug into the socket for modifying the timing circuit such that the time required for the output of the timing circuit to reach the trigger voltage is no greater than a fixed period of time which represents the longest possible exposure time.

Preferably, the value of the closing resistor is selected, such that with no flash output, the trigger generation time is about 250 ms. The value of the capacitor is selected to provide proper exposure under steady state conditions so that the value of the closing resistor is thus determined. In actual practice, it has been found that the maximum exposure time with flash operation is of the order of magnitude of 60–80 ms. and thus the closing blade will be released no later than about 60–80 ms. after exposure is initiated. This is considerably shorter than the time required for manual release of lever 30 and the shutter will thus be closed before hand movement of the camera affects exposure quality.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:
1. A shutter mechanism for a camera comprising:
 (a) shutter means operable to control the exposure interval of said camera;
 (b) a timing circuit including a light dependent resistor exposed to scene light and having a resistance value which is deepndent upon the intensity of light incident thereon, said timing circuit further including a capacitor, the current through which changes exponentially in response to initiation of exposure with a time constant dependent on at least the resistance of said light dependent resistor, said circuit producing an output in response to initiation of exposure which changes with time in a manner functionally dependent on said resistance of said light dependent resistor and hence on scene brightness;
 (c) shutter operator means responsive to the output of said timing circuit for operating said shutter means to effect exposure while said output has a level less than a preselected trigger level and to terminate exposure when said output reaches said trigger level;
 (d) auxiliary means comprising a fixed resistor connectable in said timing circuit in shunt with said light dependent resistor; and
 (e) means for connecting said fixed resistor in shunt with said light dependent resistor for establishing a predetermined maximum exposure interval during photoflash exposures in which the total amount of light received by said light dependent resistor during a period corresponding substantially to a period of flash illumination is insufficient to cause the output of said timing circuit to attain said trigger level.

2. A shutter mechanism for a camera that includes flash synchronizing contacts and a jack for electrically connecting said contacts with a flash bulb when a flash plug is inserted into said jack, said mechanism comprising:
 (a) shutter means operable to control the exposure interval of said camera;
 (b) a timing circuit including an element having a variable electrical characteristic, said circuit producing an output in response to initiation of exposure which changes with time in a manner functional dependent upon said variable electrical characteristic;
 (c) shutter operator means responsive to the output of said timing circuit for operating said shutter means to effect exposure while said output has a level less than a preselected trigger level and to terminate exposure when said output reaches said trigger level; and (d) means made effective upon insertion of said plug into said jack for modifying said timing circuit such that the time required for the output of said timing circuit to reach said trigger level is no greater than a fixed period of time which represents the longest possible exposure interval when said plug is inserted in said jack.

3. Apparatus in accordance with claim 2 wherein said element of said timing circuit is a light dependent resistor whose value is functionally related to the brightness of the scene being photographed and constitutes said variable electrical characteristic.

4. Apparatus in accordance with claim 3 wherein said timing circuit includes a capacitor, the current through which changes exponentially in response to initiation of exposure with a time constant dependent on at least the resistance of said light dependent resistor.

5. Apparatus in accordance with claim 4 wherein the last-named means of claim 2 includes a fixed resistor which is switched into shunt with said light dependent resistor when said plug is inserted into said jack.

References Cited

UNITED STATES PATENTS

| | | | |
|---|---|---|---|
| 3,063,354 | 11/1962 | Matulik et al. | 95—10 |
| 3,245,332 | 4/1966 | Kagan | 95—53 |

FOREIGN PATENTS 995,117  8/1951  France.

NORTON ANSHER, *Primary Examiner.*

J. F. PETERS, *Assistant Examiner.*